FINGERPRINT IDENTIFICATION SYSTEM AND METHOD

Original Filed Sept. 13, 1968 3 Sheets-Sheet 1

INVENTORS
MARVIN MILLER
ROBERT P. MILLER
TIBOR de CHOLNOKY, JR.
BY
Kenney, Edwards, Morton, Taylor & Adams
ATTORNEYS

FINGERPRINT IDENTIFICATION SYSTEM AND METHOD

Original Filed Sept. 13, 1968 3 Sheets-Sheet 2

INVENTORS
MARVIN MILLER
ROBERT P. MILLER
TIBOR de CHOLNOKY, JR
BY
Pennie, Edmonds, Morton, Taylor & Adams
ATTORNEYS

FINGERPRINT IDENTIFICATION SYSTEM AND METHOD

Original Filed Sept. 13, 1968 3 Sheets-Sheet 3

INVENTORS
MARVIN MILLER
ROBERT P. MILLER
TIBOR de CHOLNOKY, JR.
BY Pennie, Edmonds, Morton, Taylor & Adams
ATTORNEYS United States Patent Office 3,694,240
Patented Sept. 26, 1972

3,694,240
FINGERPRINT IDENTIFICATION SYSTEM AND METHOD

Marvin Miller, Teaneck, N.J.; Robert P. Miller, Spring Valley, N.Y. (both % Sibany Manufacturing Corp., 6 Neil Lane, Riverside, Conn. 06878); and Tibor de Cholnoky, Jr., 70 Hunting Ridge Road, Greenwich, Conn. 06830

Application Sept. 13, 1968, Ser. No. 759,698, which is a continuation-in-part of application Ser. No. 453,440, May 5, 1965. Divided and this application Aug. 14, 1970, Ser. No. 63,888

Int. Cl. A61b *5/10*

U.S. Cl. 117—.5 31 Claims

ABSTRACT OF THE DISCLOSURE

Method and apparatus for obtaining an individual's fingerprint including a fingerprint impression conforming sheet material, inking means and a fingerprint receiving surface disposed for movement toward each other upon pressing of the individual's fingerprint against the sheet material to conform said material to the fingerprint and to transfer a representation thereof, by the inking means, to said fingerprint receiving surface.

RELATED APPLICATIONS

This is a divisional application of my copending application, Ser. No. 759,698, filed Sept. 13, 1968, now U.S. Pat. No. 3,584,958 which is, in turn, a continuation-in-part application of application Ser. No. 453,440, filed May 5, 1965, now abandoned.

The present invention relates to an identification system and more particularly to a system for identifying individuals by fingerprint comparison where the individual's known fingerprint is supplied as a master print at the time the identification is to be made and such master is compared with the fingerprint taken of the person at the time of comparsion to determine if there is an identity. This comparison is made under conditions which lessen considerably the chances of false identity by imposing certain controls on the master print which cannot be readily altered or disturbed in any unauthorized manner.

In many situations, it is desirable to identify and distinguish individuals by means other than personal recognition. A common approach to this has been the issuance of personal identification cards which range in complexity depending on the purpose which they are to serve.

In some situations where convenience is of primary importance and the use of the card by unauthorized persons is only of secondary importance, the cards may merely contain the individual's name and signature and an identification number. Here, the presentation of the card will be proof enough of the user's identity if the card signature matches that of the user's as taken at the time of use.

Where, however, a more positive identification is desired at the time the card is used for its intended purpose, as for example, where the card is employed for security purposes to control access to restricted areas or restricted information, or where the card is used as a credit card and authorized use is of primary importance, the cards may be made more complex. In addition to the individual's name, signature, and identification number, such cards may also be provided with the individual's photograph and even a representation of his fingerprint. A card with this information on it may be used to identify the user at the time he attempts to use the card by comparing the individual with the photograph on the card and if for any reason further proof of the user's identity is needed, his fingerprint may be taken and analyzed by employing the well-known Henry classification system to determine if the two prints are the same. Application of this system, however, requires a skilled expert to compare the individual characteristics of the prints.

A fingerprint, according to the Henry classification system, includes such things as dots, ridge endings, islands, enclosures, bifurcations, and divergences in addition to unusual configurations found principally around core areas of the fingerprint. Each of these characteristics differs from print to print and although extensive effort has gone into attempts to mechanize or automate the various features of the Henry classification system, they have been mainly unsuccessful since the distinctions between these characteristics, as may be found in different fingerprints, are highly subjective and often arbitrary from the point of view of any mechanical apparatus. The location of a core, for instance, is governed by a complex set of rules and the distinction between what is described as a tended arch and a loop can find disagreement among the experts.

Previous mechanical efforts at reading fingerprints have lacked any reference point or base usable for comparison purposes and have failed to identify prints with a digital approach. It is apparent that where a subjective type of comparison between fingerprints is made, the procedure is time consuming and where conventional fingerprinting methods are employed, it is also cumbersome and requires the application of fingerprinting ink to the individual's finger. In addition, the certainty of the identification being made is at best limited by the assumption that the identification card has not been altered or tampered with; and, of course, it is precisely in the situation where the card is being used by an unauthorized person that this assumption should not be made.

With conventional identification systems employing an identification card, the chances of an altered card being successfully used may be lessened by including on the card a number of separate and unrelated identifying features, each of which will be checked at the time the identification is made. Nevertheless, alteration of a card by substituting the unauthorised user's own photograph and fingerprint, for example, is not usually too difficult; and unless such an altered card is checked against known information identifying the individual to whom the card was originally issued, the unauthoriezd use may very easily go undetected. Also, identification cards that might be issued to the individuals of a designated group, usually look alike unless closely examined and are thus easily substituted where identification is made merely by a visual recognition of the card. And, where such cards include a photograph of the individual, they become obsolete as the person ages. Alternatively, cards that include some type of identification number or code as the basis of the identity, acquire their own identity separate from the owner and can therefore be used apart from such owner. In such situations, it is extremely difficult to trace the misuse of the card or to catch the unauthorized person as he uses the card.

In accordance with the teachings of the present invention, an identification system is provided in which the problems encountered with conventional systems are substantially avoided. Generally, the present system does not concern itself with any of the subjective distinctions between patterns or specific characteristics of the fingerprint. Instead, the angles, curvatures, spacing of ridges, and thickness of the ridges of a fingerprint at given points are relied upon as the expression of uniqueness they produce. The system includes the actual taking of the individual's fingerprint each time an identification is made and a comparison of this fingerprint with known information of the individual allegedly being identified. The known information used in this comparison is contained on a suitable master record means and includes the individual's known fingerprint or at least a portion of it. To prevent tampering of the master record means, the information contained thereon may be coded where it is accessible to unauthorized persons or the master itself may be maintained in a place secured against such tampering. In order to make a comparison of the fingerprints at the time the identification is to be made, the prints are taken in the form of transparencies with the contrast between transparent and opaque portions representing the ridges and valleys of the fingerprint. The actual comparison of the two fingerprints is then made by superimposing the prints over each other and measuring the amount of light passing therethrough. If there is an identity between the two prints, the ridges and valleys of each will be in alignment to thus permit, a known amount of light to pass therethrough. This light may be of a maximum value where both prints are taken with the same relationship between transparent and opaque portions or where this relationship is reversed, an identity between the prints will block out all light passing through them.

In addition to the above, the present invention also includes a unique system for taking the person's fingerprint without requiring any direct application of ink to the person's finger and under controlled conditions whereby the person's print may be repeatedly produced with the same clarity and detail thus facilitating an accurate comparison between prints. Also, the present system includes provisions for permanently recording and storing the individual's fingerprint that is taken at the time the identification is made.

By using the identification system of the present invention, the security protection usually provided by security guards at such places as government installations, factories, apartment buildings, banks, and the like, can, to a great extent, be automated without decreasing the measure of protection afforded. In addition, the present system facilitates the use of the identification card as a credit card for entitling the user to certain services, as for example, charged purchases, check cashing and the purchase of goods from automatic vending machines where it is not economical to vend by labor.

The system of the present invention can be completely mechanized and automated to eliminate the possibility of human error, to increase the reliability of the identification being made and to do away with any constant supervision as usually required with conventional identification procedure. The system, by utilizing an unchanging characteristic of the individual for making an identification, is not subject to obsolesence and at the same time may be constructed at various levels of sophistication depending on the degree of security or reliability desired. The system can be made an integral part of other systems in which information about individuals is taken and recorded and the system is so constructed with controls that provide for immediate revocation of the privileges or benefits given any individual identified in the system.

A more complete understanding of the present invention will be obtained from a reading of the following description with reference being made to the accompanying drawings in which.

In one embodiment of the present invention, the known information about the individual, namely his fingerprint, is contained on a master record means in the form of an identification card issued to the individual for subsequent use at the time the identification is to be made.

In order to prevent tampering with this card, the fingerprint that is applied to it is coded to represent only a portion of the individual's fingerprint as determined by areas of intersection of the ridges or valleys of the fingerprint with a reference line drawn along a predetermined path through the fingerprint. Depending on the angle of intersection, these areas of intersection will vary in size and once they are determined, they are elongated into a series of parallel lines. In accordance with the present invention, it is these lines which are incorporated in the identification card.

When it is desired to compare the identity of the person using this card with the identity of the individual to whom the card was originally issued, the person's fingerprint is taken and brought into superimposed position with the identification card. A mask having an opening corresponding to the reference line originally used in preparing the coded fingerprint is placed over the newly taken fingerprint and the identification card and suitable sensing means are employed to compare the coded portion of the fingerprint of the card with the person's actual fingerprint to determine if there is an identity between the two fingerprints. If the card is in the possession of the rightful owner, an identity will be established.

The identification card of the present invention, besides carrying the coded portion of the individual's fingerprint, may also be provided with time code areas for receiving time period codes. With this arrangement, the use of the card may be restricted to designated time periods regardless of who is attempting to use it.

Figure 1:
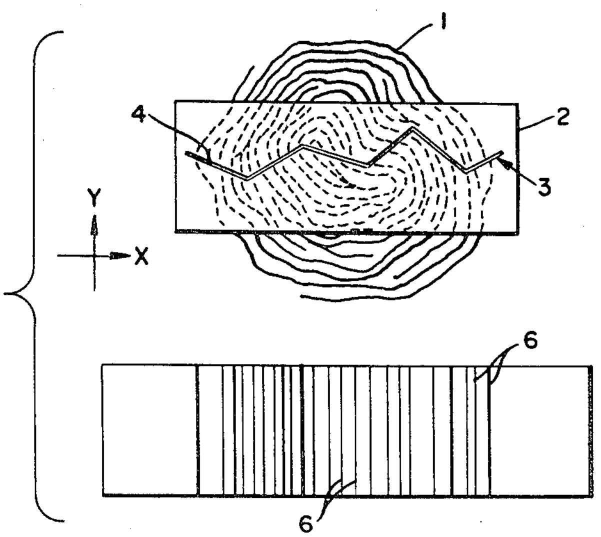
FIG. 1 is a schematic plan view of a fingerprint with a reference mask showing the translation of the coded portion of the fingerprint onto an identification card.
Figure 2:
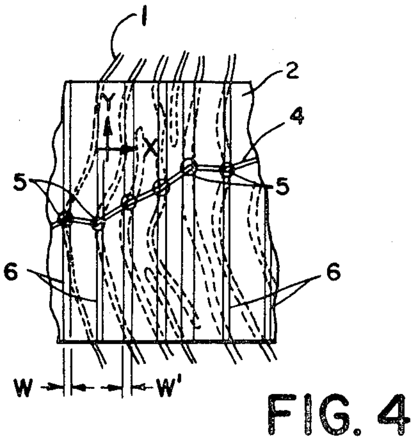
FIG. 2 is an enlarged schematic view of a portion of the fingerprint and mask shown in FIG. 1.

To form the coded portion of the individual's fingerprint as shown at 1 in FIG. 1, a reference mask 2 is placed over the print. The mask is provided with a reference opening 3 of predetermined contour for forming a reference line 4 of corresponding contour across the fingerprint. Although the reference opening 3 is zigzag in shape, it is to be understood that a smoothly curved, straight or other pattern may also be used. Depending on the shape of the reference line 4, it will intersect the lines making up the fingerprint at some definite number of locations to define areas of intersection 5 shown in the encircled portions of FIG. 2. Depending on the angle of intersection of the reference line with the fingerprint lines, the widths of the areas of intersection as measured along the X axis of FIG. 2 will vary as shown by W and W', for example.

Those areas of intersection will be different for different individuals and as such they form the basis of the coded portion of the identification card of the present invention. In using these areas of intersection as the code base, however, care must be taken to disguise them when placed on the identification card. If, for example, these areas were merely recorded directly on the identification card along a line corresponding to the reference line 4, the resulting card would not be much more tamper-proof than one having the individual's entire fingerprint, since with the reference line being known, it would be a simple matter for an unauthorized person to take his own fingerprint and transcribe it into the proper code on the identification card. As will be seen from the description that follows, this would seriously lessen the accuracy of any identification system employing such a card.

In accordance with the teachings of the present invention, these areas of intersection are elongated or extended in a direction along the Y axis as shown in FIG. 1 so as to form parallel code lines 6, each of which has a width corresponding to the width of the area of intersection that it represents.

Figure 3:
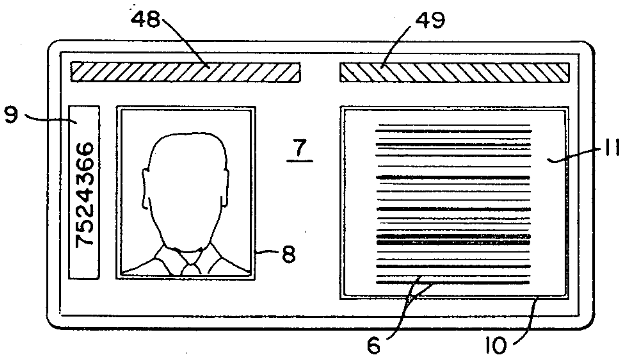
FIG. 3 is a plan view of the identification card constructed in accordance with the teachings of the present invention.

Once these code lines are determined, they may be transferred onto an identification card 7. As shown in FIG. 3, the identification card may also be provided with a conventional photograph 8 of the individual and an identification number 9, if desired. The code lines on the card are formed in a comparison area 10 and according to the presently preferred embodiment of the invention, they are formed as transparent areas on an opaque support member. For simplicity, however, FIG. 3 shows these lines simply as dark lines which are to be considered transparent portions of the surrounding support member 11 which is to be considered opaque.

After the identification card has been formed with the appropriate code lines in the comparison area thereof, the card is issued to the individual. He may then use the card as a means of identifying himself at a later date where personal recognition is either inconvenient or impractical; and in accordance with the teachings of the present invention, such an identification of the individual will be made by comparing the code lines of the identification card with the individual's fingerprint as taken at the time the card is used.

Figure 4:
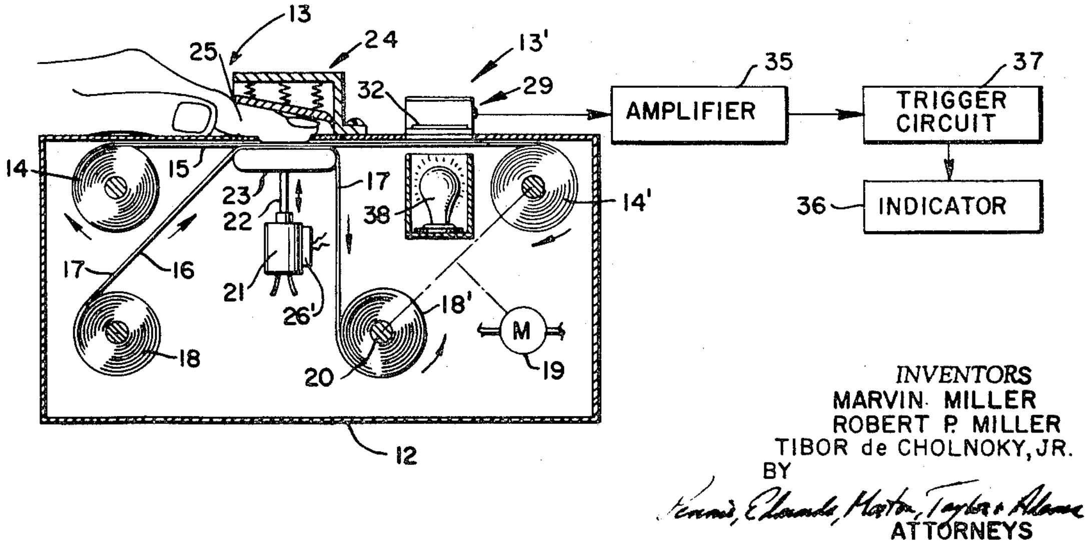
FIG. 4 is a cross-sectional view of the identification apparatus of the present invention.

As shown in FIG. 4, a comparison or identifying device 12 including a fingerprint station 13 and a comparison station 13' is provided. At station 13, the individual's fingerprint is taken and at station 13', the fingerprint is compared with the fingerprint as represented by the code lines on the comparison area of the identification card.

For taking the individual's fingerprint at station 13, a supply 14 of transparent, flexible record tape 15 is provided. This tape is made of impression conforming material in the sense that it is thin enough and flexible enough to conform precisely to the impressions and ridges defining a person's fingerprint when it is placed in pressure contact with the finger. An example of such a material is polyethylene sheet having a thickness of about .5 mil. Cooperating with the tape 15 in the fingerprinting operation is a second tape 16 which is covered with a coating of ink 17 on the upper side thereof as viewed in FIG. 4. The inked tape 16 is adapted to be fed from a supply roll 18 onto a take-up roll 18' by way of suitable motor 19 connected to the take-up roll shaft 20, for example. As shown in FIG. 4, the record tape 15 is also adapted to be wound onto a take-up roll 14' and this may be conveniently effected by the same driving motor employed for winding the tape 16.

In taking the individual's fingerprint at station 13, the finger as viewed in FIG. 4 is brought into contact with the upper side of the record tape 15. At this time, a solenoid 21 is actuated to extend its plunger 22 in an upward direction. The end of the plunger is provided with an impression pad 23 for pressing the inked tape 16 against the record tape 15 and the record tape, in turn, into pressure contact with the individual's finger. This movement conforms the record tape 15 to the contour of the fingerprint and at the same time produces an ink representation of the fingerprint on the bottom of the record tape 15. It will be noted that with this construction, the fingerprint of the individual has been taken without applying any ink directly to the finger and this has the obvious advantage of cleanliness over conventional fingerprinting methods.

During the taking of the individual's fingerprint, it is desirable to have the finger placed in a predetermined position relative to the direction of tape feed. This position will depend on how the comparison area of the identification card was formed and its orientation in the comparison station 13'. Where, for example, the original fingerprint of FIG. 1 is taken with the finger pointing in the X direction and the code lines drawn at right angles along the Y direction, and where the card is then positioned at station 13' with the code lines again extending in the Y direction, as viewed in FIG. 5, the finger should preferably extend in the X direction. If this orientation is provided, the resulting fingerprint will, when fed to the right in FIG. 4, pass through a position in which it will be aligned with the code lines 6 of the identification card in the same way as the fingerprint was originally aligned with respect to the reference opening 3 of the mask 2.

Figures 5, 6, 7, 9, 10, 11, 12:
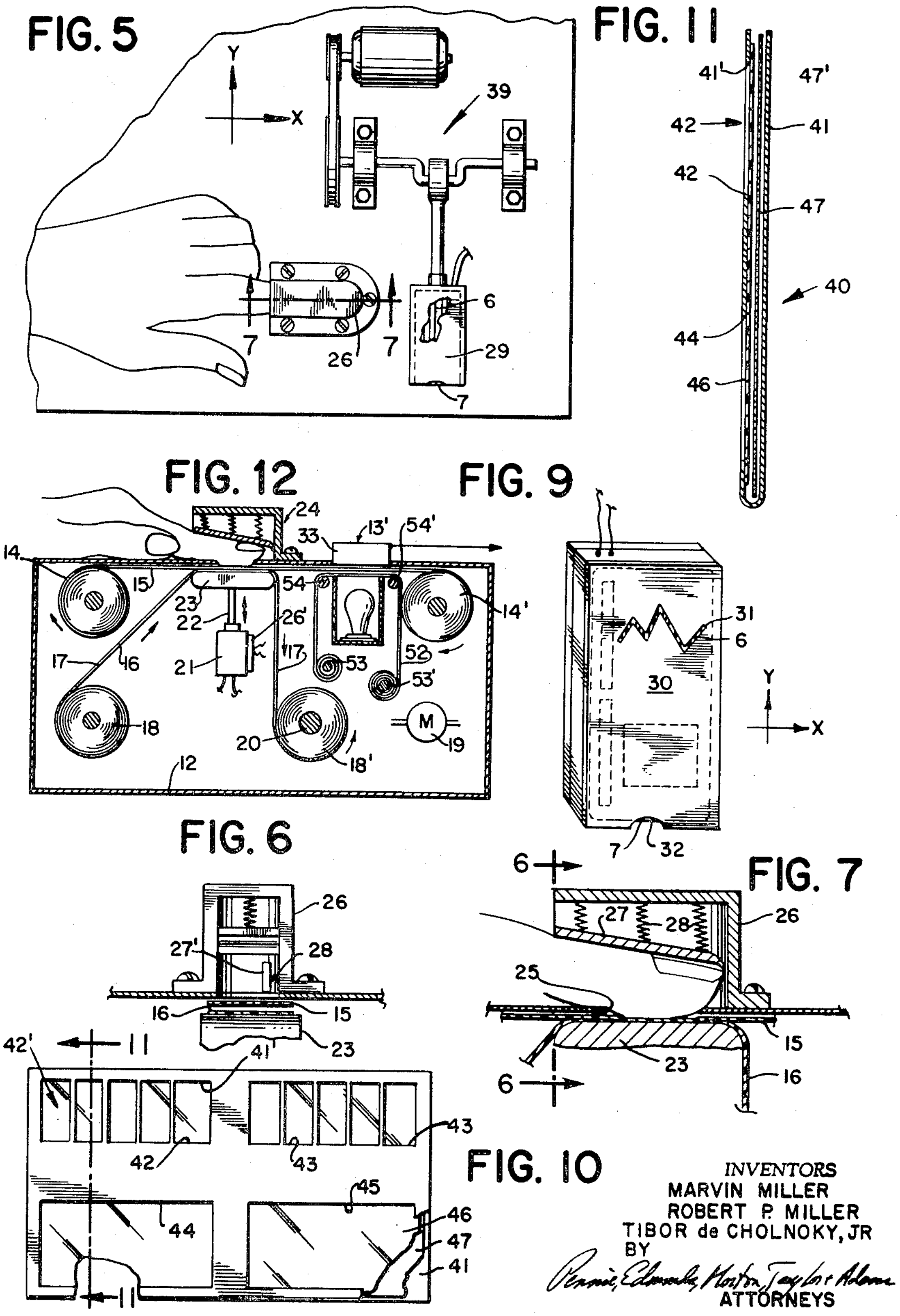
FIG. 5 is a top plan view of the apparatus shown in FIG. 4.
FIG. 6 is an end view of the finger holding device shown in FIGS. 4 and 5.
FIG. 7 is a cross-sectional view of the finger holding device.
FIG. 9 is a perspective view of the scanning head shown in FIGS. 4 and 5.
FIG. 10 is a front view, partially broken away, of one embodiment of the finger printing means of the invention.
FIG. 11 is a cross-sectional view taken along lines 11—11 of FIG. 10.
FIG. 12 is a cross-sectional view of a modified embodiment of the identifying apparatus of FIG. 4.

For holding the finger in the desired position while the fingerprint is formed, a holding device 24, shown in FIGS. 6 and 7, is attached to the identifying apparatus at station 13 directly over the opening 25. The holding device itself comprises a frame member 26 and alignment members 27, 27' which are disposed inside the frame and biased in downward and sideward directions, respectively, by means of the spring elements 28. When the fingerprint is to be taken, the appropriate finger is inserted into the holding device and against the stationary side wall to effect longitudinal alignment of the fingerprint with respect to the record tape 15. During the actual fingerprinting operation, the members 27, 27' will aid in holding the finger in proper engagement with the record tape so that the latter may conform thereto as the pressure pad 23 is moved into its upper position as shown in FIG. 4. In addition, the upper wall portion of the identifying device, where it defines the opening 25 through which the finger is exposed to the tape 15, acts to support the finger in the vertical direction; and in order to control the pressure with which the finger and tape 15 are pressed against each other through opening 25 during a fingerprinting operation, suitable pressure control means 26' are provided. This control, which may be connected with the solenoid mechanism 21, controls the pressure with which the pad 23 strikes the tapes 15 and 16 against the finger and may be set so that a constant pressure will be employed each time a fingerprint is taken. In this way, consistently high quality prints may be produced. If desired, suitable skin sensing means, not shown, may be operatively connected to the holding device 24 for sensing the presence of a human finger and for sounding an alarm or warning if the apparatus is being tampered with at this station.

Figure 8:
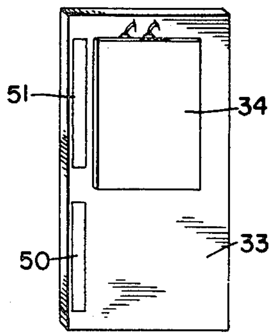
FIG. 8 is a perspective view of the sensing plate portion of the scanning head shown in FIGS. 4 and 5.

After the fingerprinting operation is completed, the motor 19 is actuated to move the fingerprint into the comparison station 13'. At the same time, the inked tape 16 will be fed forward to position a clean portion over the pad 23 ready for the next fingerprinting operation. A scanning head 29 is located in the comparison station 13'; and as shown in FIGS. 8 and 9, this head includes a front reference plate 30 having a reference opening 31 identical with the particular reference opening 3 used in forming the coded portions of the identification cards. The scanning head has a slot 32 through which the identification card 7 is to be inserted; and the opening 31 is so oriented with respect to this slot whereby upon insertion of the identification card, the opening will be disposed over the card's comparison area 10 and aligned along the X axis with respect to the code lines 6 in the same manner as the original orientation of the reference line 4 with respect to these lines. The actual width of the opening 31 may be slightly larger than the width of the reference line 4 to take into account any slight inaccuracy in the positioning of the card in the slot 32.

The back plate 33 of the scanning head includes a suitable photocell 34 which, as shown in FIG. 4, is electrically connected to an amplifier 35 which is, in turn, connected to an indicator 36 through the trigger circuit 37. Cooperating with the photocell 34 is a light source 38 adapted to direct a beam of light through both the opening 31 and the aligned portions of the identification card and record tape. As mentioned above, the finger is preferably aligned properly in the X direction so that the fingerpring formed on the record tape 15 will be properly oriented with respect to the code lines 6. Since, however, only the portion of the code lines visable through the reference opening 31 are to be used in making the comparison with the fingerprint on the tape 15, suitable means 39 are provided for oscillating the scanning head in the Y direction as the tape is moved in the X direction.

At some time during this movement, the fingerprint on the tape 15, if it corresponds to the fingerprint represented by the code lines 6, will come into the same alignment with these lines and then opening 31 as the original alignment of the fingerprint and mask 2. Of course, if proper alignment of the fingerprint on the tape 15 along the X direction cannot be assured, a compound scanning movement of the head will be effected. In either case, the scanning movement will be such as to assure an alignment of the two fingerprints if they are the same.

As shown in FIG. 5, the scanning head 29 and the inserted card 7 are both oscillated along the Y direction. Instead of this, the card could remain stationary with only the scanning head being oscillated. This is so because of the code lines which are parallel to each other and which are of uniform thickness in the direction of head oscillation. Also, if it is found desirable in a particular situation, both the card 7 and scanning head 29 could remain stationary and the tape 15 fed across the opening 31 with a compound scanning movement.

In the preferred embodiment of the present invention, the code lines 6 are transparent and the fingerprint on the tape 15 is opaque. With this arrangement, alignment of the two will block out all light passing to the photocell 34 and this, in turn, will create a signal for actuating the indicator 36 to record or otherwise inform the operator of the apparatus that an identity between the two fingerprints has been established.

In addition to using an opaque card with transparent code lines 6 and a transparent tape 15 having an opaque fingerprint, it is, of course, possible to use this type of card with a fingerprint represented by transparent lines. In such a situation, identify between the two fingerprints will create a predetermined number of light points striking the photocell 34. The number of light points will be determined by the number of interesection areas 5 of the individual's fingerprint and this information may be coded onto the identification card so that the photocell may be preset upon insertion of the card into the scanning head to signal an identity only when the proper amount of light is sensed.

In addition to the above two arrangements, it is to be understood that it is also within the teachings of the present invention to use a transparent identification card with opaque code lines and either a transparent or opaque tape 15 having respective opaque and transparent fingerprints thereon. Also, it is to be understood that, if desired, the comparison between the two fingerprints could be effected by reflecting or photographically projecting the fingerprint of the record tape 15 and the masked comparison area 10 of the identification card onto a common screen, this would avoid the feeding operations depicted in FIG. 4; but in some situations might be too time-consuming or expensive.

In the embodiment of the present invention shown in FIG. 4, the tape 15, after passing through the comparison station 13', is advantageously wound onto the take-up roll 18 so as to provide a permanent recordation of the fingerprint of every individual using the identification system.

Figure 13:
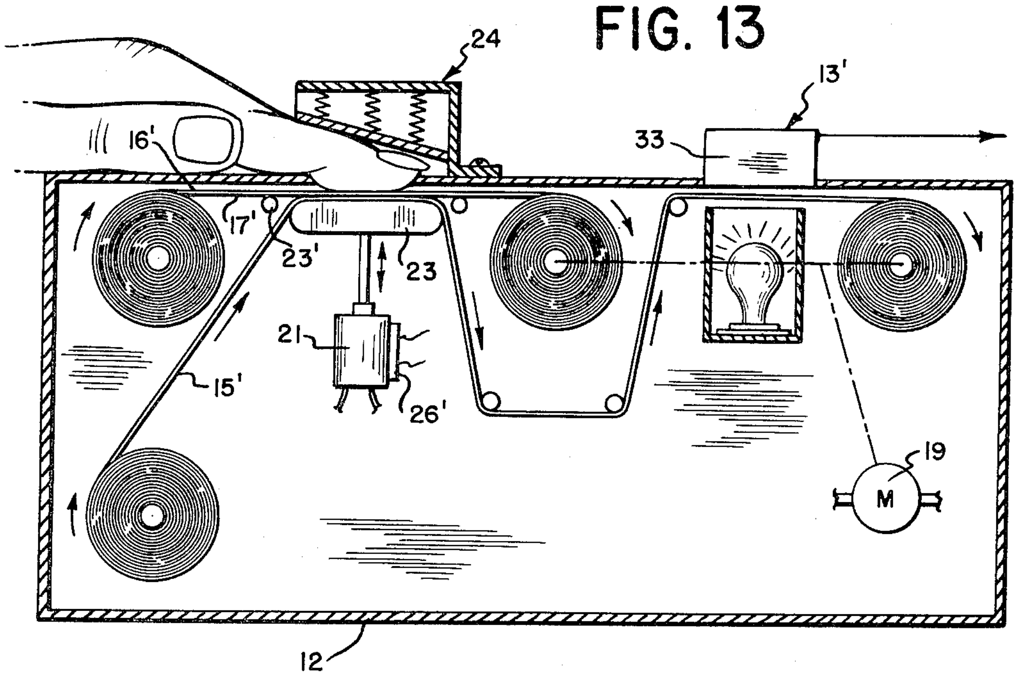
FIG. 13 is a cross-sectional view of another modified embodiment of the identifying apparatus of the present invention.

As an alternative to the above-described system of taking the individual's fingerprint at the time an identification is to be made, the tapes 15 and 16 may be replaced by tapes 15' and 16' as shown in FIG. 13. In this embodiment of the invention, the underlying tape 15' defines the record means for receiving the individual's fingerprint on its upper surface for comparison in the comparison station 13'. The tape 16' may be made of polyurethane film, of a thickness of 0.4 mil with a hardness of Shore 78A durometer, or it may be made from other types of film such as polyethylene or Mylar.

For taking the individual's fingerprint on the upper fingerprint receiving surface of the tape 15', the overlying tape 16' is provided with an inking means in the form of an inked surface 17' facing the fingerprint receiving surface of the tape 15'. The ink transferring surface may include a coating of slow drying ink such as that used on tape 16 in the embodiment of the present invention shown in FIG. 12 or it may be comprised of a dry opaque powder-like material such as Mogul L carbon black manufactured by the Cabot Corporation. The carbon black is either coated onto the surface of the film 16' in dry form by a rubbing operation or a liquid suspension of carbon black with a low boiling solvent is coated onto the film and allowed to dry, thereby leaving the carbon black as a removable residue. Where dry opaque material such as carbon black is used as the inking means, the upper fingerprint receiving surface of the record tape 15' is provided with a coating of adhesive for effecting the transfer of the fingerprint thereto. A suitable adhesive is General Electric's adhesive #SR585. The coating is applied to the upper surface of the tape 15' by suitable means to a thickness of about 0.5 mil, and where the tape 15' is transparent, the adhesive will have like properties to permit transmission of light therethrough at the comparison station.

With the use of the fingerprinting apparatus as shown in FIG. 13, the control of the movement of the tapes in the taking of the fingerprint is preferably effected by the same mechanism as used in the embodiment shown in FIG. 4. Instead of mounting the impression pad 23 for movement, however, it may be fixed in a raised position and guide members 23' will normally maintain the tapes 15' and 16 spaced from each other. With this construction, the individual's fingerprint is taken by the individual pressing his finger downward to move the tape 16' into engagement with the tape 15' which is supported by the stationary impression pad.

As an alternative to using the continuous type of arrangement shown in FIG. 4, it is also within the scope of the present invention to use separate fingerprint recording cards. As shown in FIG. 10, these cards, designated 40, are generally envelope shaped and are comprised of four parts; a back body member 41, a front body member 41' having a plurality of windows 42–45, a record material 46, and an inked member 47. The windows 42 and 43 provide space for recording all ten fingerprints of the individual and the windows 44 and 45 for recording the two hand prints. In addition, the center portion of the card provides space for recording futher information about the individual such as his name, general appearance, and purpose for using the card.

When the card 40 is employed for comparing a person's fingerprint with that on an individual's identification card 7, it will of course only be necessary to compare one of the ten fingerprints shown in windows 42, 43 with the coded fingerprint 6. This fingerprint, designated at 42', is fed through the comparison station 13' in the same manner as the fingerprint on the tape 15 and after a comparison has been made, the card may be filed away in an appropriate place to provide a permanent recordation of the individual identified.

To facilitate the taking of the fingerprints on the card 40, the record material 46 is made of the same transparent material to conform to the impression and ridges of the person's fingerprint and allows for the transmission of light when the card is moved to the comparison station 13'. Also, the inked member 47 is provided with an inked surface 47' facing the record material so that the pressure of the person's finger against the record material will produce a reproduction of the fingerprint on its undersurface.

In order that card 40 may be used at the comparison station 13', the inked member 47 is made as a removable part of the card and the backing member 41, in at least the area behind the fingerprint 42', is made of transparent material. With this construction, light from the source 38 may readily pass through the backing member to the fingerprint 42' for sensing by the photocell 34'.

The fingerprint card 40 shown in FIG. 10, in addition to providing a means for taking an individual's fingerprint at the time the identification is being made, may instead be employed for taking fingerprints at any other time and at any given location. The person's prints are taken by merely pressing the fingers and hands against the appropriate window surfaces of the card, and subsequent removal of the inked member 47 will uncover the backing member 41. For purposes of providing maximum contrast against the inked reproductions of the fingerprints, the backing member may be made of white or other light colored material; and of course, where the card is to be used in the identifying device 12 for comparing fingerprints, the backing 41 behind the fingerprint 42' is made removable or transparent. Where the backing 41 is made transparent, an additional sheet of white or light colored material may be positioned within the envelope member 40 so that the fingerprints may be examined independently of the identifying device 12.

With the fingerprint card 40 of the present invention, it is seen that a person's fingerprints may be quickly and easily taken without requiring any of the conventional fingerprinting apparatus and without the inconvenience of applying ink directly to the finger.

Figure 14:
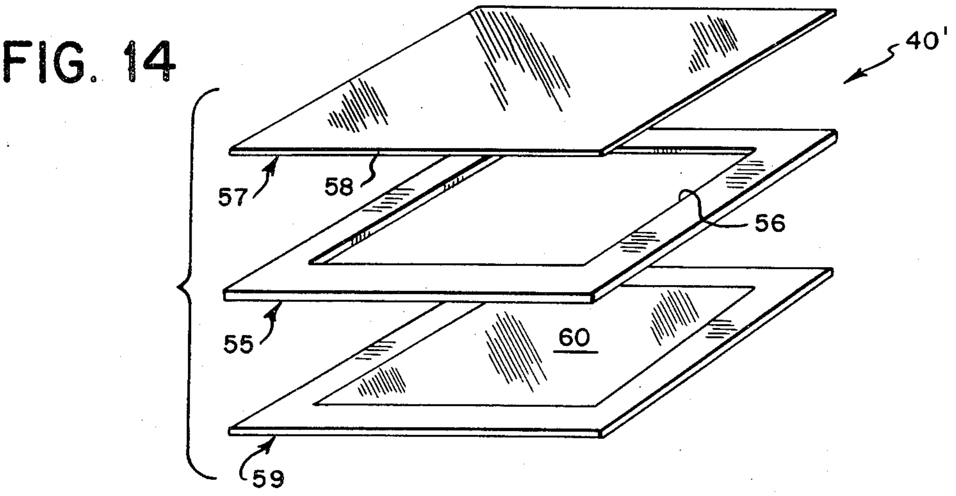
FIG. 14 is an exploded view of a modifying embodiment of the fingerprinting means of the present invention.
Figure 15:
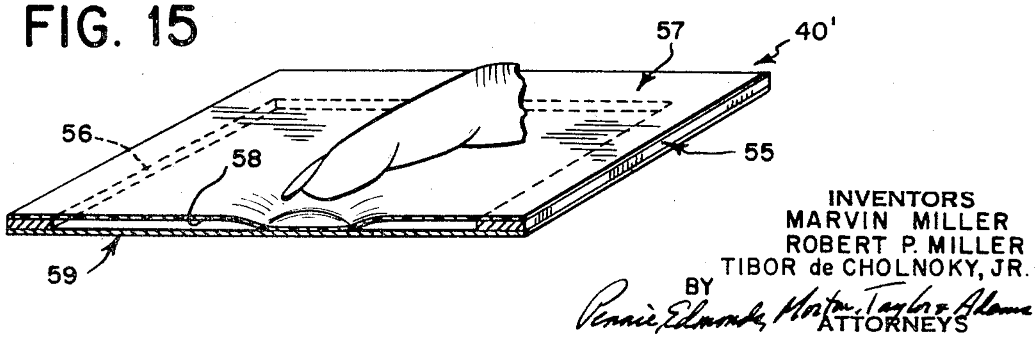
FIG. 15 is a perspective view, in section, of another embodiment of the finger printing means of the present invention.

Another form of a fingerprint card usable in the identifying device of the present invention is shown in FIGS. 14 and 15. This card generally designated at 40' includes a body member 55 having a window 56 across which a piece of transparent sheet material 57 is attached. The body member is made of a cardboard or other suitable material having a thickness of about 1/16 of an inch while the sheet 57 is comprised of a thin, impression conforming material such as that used for the tapes 16' in the embodiment of the invention shown in FIG. 13. Also, as with the tape 16', the film 57 is provided with an inking means 58 on the surface facing through the window 56 of the body member.

As shown in FIG. 14, the card 40' includes a second sheet of material 59 disposed on the side of the body member opposite the sheet material 57. This second sheet of material has a central transparent portion 60 aligned with the window 56 of the body member. Alternatively, the material 59 may be entirely transparent. In either case, the portion aligned with the window of the body member comprises a record means for receiving an inked impression of the individual's fingerprint on its upper fingerprint receiving surface. As with the tape 15', the sheet material 59 will be provided with a suitable adhesive where the inking means on the sheet material 57 is of the dry powdered type.

The sections of the card 40' are attached to each other at the borders thereof with the sheet material 57 and the body member 55 being removable. In assembled condition, the body member 55 normally holds the two materials 57 and 59 spaced from each other to prevent accidental transferring of ink into the sheet 59. When a fingerprint is to be taken, the individual simply presses his finger against the inked impression conforming sheet to move it through the window of the body member and its inked surface into contact with the fingerprint receiving surface of the sheet 59.

When the cards of the construction shown in FIG. 14 are used in the identifying device of the present invention, a suitable supply thereof will be provided for sequential feeding to the fingerprinting station 13 and then onto the comparison station 13'. Between these two stations the sheet material 57 and the body member 56 will be removed so that a fingerprint defined by the contrast of opaque and transparent portions will be provided in the comparison station.

With the card construction 40', the fingerprint taken on the fingerprint receiving surface of the sheet 59 may be examined independently of the identifying devices 12. This is easily accomplished by simply positioning the sheet 59, after removal of the sheet 57 and the body member 55, on an opaque surface. Alternatively, the sheet 59 of the card 40' may be made from white cardboard, oak tag material, or white P.V.C. material having a thickness of about 0.010 inch. The card 40' is well suited for use independently of the identifying device of the present invention since the fingerprint is formed directly onto an opaque surface and easily examined. Also, it is possible to use such a card construction in the identifying device of the present invention by simply removing the opaque sheet material 59 and feeding such cards into overlying relation with a continuous tape such as the tape 15' used in the embodiment of the invention shown in FIG. 13.

In addition to the above, the identifying system of the present invention includes a time control arrangement for limiting the use of any particular identification card to a prescribed time period. For this purpose, the identification card 7 as shown in FIG. 3 is provided with a pair of time period code areas 48, 49. These two code areas may include separate magnetic recording zones and are adapted to receive coded information thereon by means of any suitable sensing and recording mechanisms such as represented at 50, 51 in FIG. 8. Since these sensing and recording mechanisms are themselves conventional in construction, they are merely shown schematically in the drawings.

The purpose of the two time period areas is to provide a means whereby the use of the identification card during different time periods may be controlled. The inclusion of such time period code areas would be advantageous where the card is to be used from day to day and it is desired to make certain that an old expired card is not used.

To effect this control, the two code areas 48 and 49 are used alternately to carry consecutive time period codes. For example, if the time period is to be a single day in length, then one of the code areas, say area 48, will, during the first day and by means of the recorder 50, be provided with the time period code for that day. As long as this code is retained on the area 48, the card may be used during that first day and each time it is inserted into the scanning head 29, the code in the area 48 will be sensed by the mechanism 50 and compared with the known code for that day. The mechanism 50 may also include suitable means for indicating an identity or non-identity between the two codes. Before the last use of the card during the first time period, which in this example is one day, the code for the next day is placed in the code area 49 through actuation of the sensing and recording mechanism 51 and accordingly, when the card is used in the next time period, the code in area 49 will correspond to the known code for that period. To prepare the card for the next succeeding time period, the old code in area 48 will be erased sometime during the second time period and replaced with the next time period code by means of the mechanism 50. From the above, it is apparent that the new code for each successive time period will be placed alternately on the separate code areas 48, 49 as these succeeding time periods are reached.

In another embodiment of the present invention, where for example, the identification apparatus is used to identify employees entering their place of employment, a master print of each employee is maintained within the apparatus itself in a central reference file or information retriever, and the employee as he seeks entrance, triggers such apparatus to automatically bring his alleged master print into the comparison station. He then has his fingerprint taken and the two prints are automatically compared for identity. In this embodiment of the present invention, the master prints of all employees are at all times retained within the identifying apparatus against all unauthorized access.

As shown in FIG. 12, the master prints of all the individuals to be identified in the system are retained on a master record means comprising a tape 52 which is directed from one roll 53 around guide 54, past the comparison station 13', around guide 54', and onto another roll 53'. Instead of a tape 52, the master prints can be contained on individual cards, if desired. In either case, suitable means, such as used for oscillating the sensing head 29, may be employed for oscillating a photocell unit 34' and the master record in the Y direction as the tape 16 is moved in the X direction to effect a comparison of the prints.

To bring the individual's master print into the sensing station where, for example, tape 52 is used as the master record, the individual may be given a number which he will set on suitable means on the identifying device 12 to cause the tape 52 to be fed from one roll to the other until the corresponding print is disposed below the photocell unit 34'. Alternatively, the individual may be supplied with a card which is keyed to the appropriate number of the central reference representing the desired master print. In either case, protection against a false identification is provided since the individual, once he has caused his alleged master print to be positioned in the sensing station, must still have his fingerprint taken at station 13 for immediate comparison with such master and an identity between the two prints will accordingly not be possible unless the master print is in fact that of the individual being identified.

The foregoing specification includes a description of the preferred construction of the present invention; however, it is to be understood that various changes can be made without departing from the scope of the invention as set forth in the following claims.

We claim:

1. In an identification system, the combination comprising:

(a) a fingerprint impression conforming sheet material constructed of material which is sufficiently thin and flexible to conform to the impressions and ridges of a fingerprint when placed in pressure contact with the finger whereby the surface of the material facing away from the finger presents a representation of said fingerprint;

(b) inking means disposed on one side of said sheet material, said inking means including a slow drying wet ink or dry powder-like ink capable of reproducing said fingerprint upon pressure contact with the surface of the impression conforming material facing away from the finger and with a fingerprint receiving surface;

(c) a fingerprint receiving surface disposed on said one side of the sheet material and normally aligned with but spaced from said inking means;

(d) means for aligning an individual's finger in position against the opposite side of said sheet material;

(e) means for effecting movement of said sheet material, inking means and fingerprint receiving surface relative to each other to bring said sheet material, inking means and fingerprint receiving surface together with said inking means contacting said fingerprint receiving surface at a point directly opposite said finger to conform said sheet material to the fingerprint of said finger and form an inked reproduction of such fingerprint on said fingerprint receiving surface.

2. An identification system as set forth in claim 1 wherein:

(a) said fingerprint receiving surface is defined by the surface of said sheet material facing said inking means.

3. An identification system as set forth in claim 2 wherein:

(a) said impression conforming sheet material is transparent polyethylene of a thickness of about 0.5 mil.

4. An identification system as set forth in claim 3 wherein:

(a) said means for effecting relative movement between said sheet material and inking means includes means for bringing said inking means into a predetermined pressure contact with the one side of said sheet material at the point directly opposite said finger.

5. An identification system as set forth in claim 4 wherein:

(a) said inking means comprises a sheet material having one side coated with a wet ink.

6. An identification system as set forth in claim 1 wherein:

(a) said fingerprint receiving surface is defined by the surface of a second sheet of material disposed on the side of the inking means opposite the impression conforming sheet material.

7. An identification system as set forth in claim 6 wherein:

(a) said inking means comprises a wet ink adhered to the surface of said impression conforming sheet material facing the second sheet material.

8. An identification system as set forth in claim 6 wherein:

(a) said fingerprint receiving surface includes a coating of adhesive thereon; and (b) said inking means comprises a dry, opaque material.

9. An identification system as set forth in claim 8 wherein:

(a) said dry, opaque material is removably adhered to the surface of said impression conforming sheet material facing said second sheet of material.

10. An identification system as set forth in claim 9 wherein:

(a) said impression conforming sheet material is polyurethane of a thickness of about 0.4 mil.

11. An identification system as set forth in claim 10 wherein:

(a) said second sheet of material and the adhesive coating thereon are transparent.

12. In an identification system, the method comprising the steps of:

(a) placing an impression conforming flexible sheet of material in a predetermined position, said impression conforming sheet being constructed of material which is sufficiently thin and flexible to conform to the impressions and ridges of a fingerprint when placed in pressure contact with the finger whereby the surface of the material facing away from the finger presents a representation of said fingerprint;

(b) holding the fingerprint surface of an individual's finger against one side of said material;

(c) maintaining an inking means on the other side of said material, said inking means including a slow drying wet ink or dry powder-like ink capable of reproducing said fingerprint upon pressure contact with the surface of the impression conforming material facing away from the finger and with a fingerprint receiving surface;

(d) pressing said material and finger against each other to conform said material to the fingerprint surface;

(e) simultaneously pressing said material and said inking means against a fingerprint receiving surface to cause said ink to adhere to said fingerprint receiving surface in the area corresponding to the raised portions of said fingerprint.

13. In an identification system, the method as set forth in claim 12 wherein:

(a) said fingerprint receiving surface is defined by the surface of said material facing said inking means.

14. In an identification system, the method as set forth in claim 12 wherein:

(a) said fingerprint receiving surface is defined by the surface of a second sheet of material disposed on the side of the inking means opposite the impression conforming sheet material.

15. In an identification system, the method as set forth in claim 14 wherein:

(a) said inking means is a wet ink adhered to the surface of said impression conforming sheet material facing the second sheet material.

16. In an identification system, the method as set forth in claim 14 wherein:

(a) an adhesive coating is provided on said fingerprint receiving surface; and (b) said inking means is a dry, opaque material.

17. In an identification system, the method as set forth in claim 16 wherein:

(a) said dry, opaque material is removably adhered to the surface of said impression conforming material facing said second sheet of material.

18. In an identification system, the combination comprising:

(a) a body member having at least one window therein;

(b) a piece of impression conforming sheet material secured across the window of said body member, said impression conforming sheet being constructed of material which is sufficiently thin and flexible to conform to the impressions and ridges of a fingerprint when placed in pressure contact with the finger whereby the surface of the material facing away from the finger presents a representation of said fingerprint;

(c) inking means disposed on one side of said sheet material, said inking means including a slow drying wet ink or dry powder-like ink capable of reproducing said fingerprint upon pressure contact with the surface of the impression conforming material facing away from the finger and with a fingerprint receiving surface; and (d) a fingerprint receiving surface disposed on the one side of said sheet material in alignment with said window and normally spaced from said inking means whereby positioning of an individual's finger against the opposite side of said sheet material conforms said sheet material to the individual's fingerprint and causes contact of said inking means with said fingerprint receiving surface in a pattern corresponding to said fingerprint to form an inked reproduction of said fingerprint thereon.

19. In an identification system as set forth in claim 18 wherein:

(a) said fingerprint receiving surface is defined by the surface of said sheet material facing said inking means.

20. In an identification system as set forth in claim 19 wherein:

(a) said impression conforming sheet material is transparent polyethylene of a thickness of about 0.5 mils.

21. In an identification system as set forth in claim 19 wherein:

(a) said body member is an envelope shaped structure having front and back sections; and (b) said inking means comprises a sheet of ink transferring paper removably positioned within said envelope wtih an ink transferring surface facing said window.

22. In an identification system as set forth in claim 21 wherein:

(a) said impression conforming material is polyethylene having a thickness of about .5 mil.

23. In an identification system as set forth in claim 21 wherein:

(a) the back section of said body member is of a color contrasting with the color of the ink on said ink transferring paper.

24. In an identification system as set forth in claim 21 wherein:

(a) the back section of said body member is transparent in the area disposed in alignment with said windows.

25. In an identification system as set forth in claim 18 wherein:

(a) said fingerprint receiving surface is defined by the surface of a second sheet of material disposed on the side of the inking means opposite the impression conforming sheet material.

26. In an identification system as set forth in claim 25 wherein:

(a) said sheets of material are disposed on opposite sides of said body member with the thickness of said body member normally maintaining said sheets spaced from each other.

27. In an identification system as set forth in claim 26 wherein:

(a) said inking means comprises a wet ink adhered to the surface of said impression conforming sheet material facing the second sheet material.

28. In an identification system as set forth in claim 26 wherein:

(a) said inking means comprises a dry opaque material; and (b) said fingerprint receiving surface includes a coating of adhesive thereon.

29. In an identification system as set forth in claim 28 wherein:

(a) said dry, opaque material is removably adhered to the surface of said impression conforming sheet material facing said second sheet of material.

30. In an identification system as set forth in claim 29 wherein:

(a) said second sheet of material is an opaque color contrasting with the color of said inking means; and (b) said body member with said impression conforming sheet of material thereon is removably secured to said second sheet of material.

31. In an identification system as set forth in claim 30 wherein:

(a) said impression conforming sheet material is polyurethane of a thickness of about 0.4 mils.

References Cited

UNITED STATES PATENTS

| | | | |
|---|---|---|---|
| 2,782,543 | 2/1957 | Soto | 117—0.5 |
| 3,479,987 | 11/1969 | French | 118—31.5 |
| 3,376,162 | 4/1968 | Spencer | 117—36.3 |
| 3,410,711 | 11/1968 | Hoge | 117—36.3 |
| 3,203,832 | 8/1965 | Mino et al. | 117—36.3 |
| 3,584,958 | 6/1971 | Miller et al. | 356—71 |

MURRAY KATZ, Primary Examiner

U.S. Cl. X.R.

117—36.1; 118—31.5; 283—7; 356—71, 168

PO-1050
(5/69)

UNITED STATES PATENT OFFICE

CERTIFICATE OF CORRECTION

Patent No. 3,694,240 Dated September 26, 1972

Inventor(s) Marvin Miller, Robert P. Miller & Tibor deCholnoky, Jr.

It is certified that error appears in the above-identified patent and that said Letters Patent are hereby corrected as shown below:

Column 1, line 8, "Conn. 06830" should read --Conn. 06830, assignor to Precision Dynamics Corporation, Burbank, California--.

Column 2, line 19, "tended" should read --tented--.

Column 3, line 48, "procedure" should read --procedures--.

Column 4, line 49, "between the two" should read --between two--.

line 74, "Those" should read --These--.

Column 7, line 11, "fingerpring" should read --fingerprint--.

line 22, "and then" should read --and the--.

line 51, "identify" should read --identity--.

Column 8, line 1, "take-up roll 18" should read --take-up roll 18'--.

line 11, "0.4 mil" should read --0.4 mils--.

line 11, "Shore 78A" should read --Shore 78.A--.

line 35, "0.5 mil" should read --0.5 mils--.

line 61, "futher" should read --further--.

Column 9, line 1, "material to conform" should read --material as the record tape 15. This permits the record material to conform--.

line 1, "impression" should read --impressions--.

FO-1050
(5/69)

UNITED STATES PATENT OFFICE
CERTIFICATE OF CORRECTION

Patent No. 3,694,240 Dated September 26, 1972

Inventor(s) Marvin Miller, Robert P. Miller & Tibor deCholnoky, Jr.

It is certified that error appears in the above-identified patent and that said Letters Patent are hereby corrected as shown below:

Column 10, line 18, "0.010 inch" should read --0.010 inches--.

Column 12, line 7, "0.5 mil" should read --0.5 mils--.

line 43, "0.4 mil" should read --0.4 mils--.

Column 13, line 70, "wtih" should read --with--.

Signed and sealed this 15th day of May 1973.

(SEAL)
Attest:

EDWARD M.FLETCHER,JR.
Attesting Officer

ROBERT GOTTSCHALK
Commissioner of Patents